United States Patent
Liebenow

(10) Patent No.: US 7,444,025 B2
(45) Date of Patent: Oct. 28, 2008

(54) MOTION ENCODING OF STILL IMAGES

(75) Inventor: Frank Liebenow, Jefferson, SD (US)

(73) Assignee: Gateway Inc., Irvine, CA (US)

(*) Notice: Subject to any disclaimer, the term of this patent is extended or adjusted under 35 U.S.C. 154(b) by 627 days.

(21) Appl. No.: 11/022,978

(22) Filed: Dec. 24, 2004

(65) Prior Publication Data

US 2006/0140489 A1 Jun. 29, 2006

(51) Int. Cl.
  *G06K 9/36* (2006.01)
  *G06K 9/68* (2006.01)
  *G06K 9/46* (2006.01)

(52) U.S. Cl. .................. 382/232; 382/218

(58) Field of Classification Search ........... 382/218, 382/219, 232, 233, 254, 276, 260–264, 305, 382/164, 173; 348/96; 396/238; 711/115; 386/46, 125; 358/3.26, 527

See application file for complete search history.

(56) References Cited

U.S. PATENT DOCUMENTS

| 4,165,929 | A | * | 8/1979 | Ito et al. ............... 396/238 |
| 5,487,161 | A | * | 1/1996 | Koenck et al. ......... 711/115 |
| 7,065,255 | B2 | * | 6/2006 | Chen et al. ............ 382/260 |
| 2004/0091240 | A1 | * | 5/2004 | Takei ..................... 386/46 |
| 2006/0140489 | A1 | * | 6/2006 | Liebenow ............... 382/232 |

OTHER PUBLICATIONS

Ullrich Hafner; Image and Video Compression;Linux Journal; Jan. 1, 2001; Issue 18; Specialized Systems Consultants, Inc.; USA.

* cited by examiner

*Primary Examiner*—Amir Alavi
(74) *Attorney, Agent, or Firm*—Jeffrey A. Proehl; Woods Fuller Shultz & Smith

(57) ABSTRACT

The present invention is directed to a method and apparatus for encoding a series of still images. The first image is captured and stored, then for each subsequent image of the series, that image is captured and compared to the first image or the previous image and difference information between the first or previous image and each subsequent image of the series is stored, resulting in one output file that contains the base image and difference information for each subsequent image, thereby reducing the amount of storage needed to store a series of images.

20 Claims, 4 Drawing Sheets

MOTION ENCODING OF STILL IMAGES

FIELD OF THE INVENTION

The present invention generally relates to the capture of images, and more particularly relates to compressing and storing digital still photographic images in a more efficient manner.

BACKGROUND OF THE INVENTION

Digital cameras capture and store a large number of digital images. Fortunately, the capacity of memory cards used to store these images is increasing so that the cards are able to hold larger and larger numbers of images. Working against this increasing capacity in memory cards is the increasing resolution of image sensors in the cameras, which require the creation of larger files to store each individual image. The total number of images that can be stored on a particular memory card is proportional to the size of the memory card, the resolution of the images, and the effectiveness of the compression algorithms used to reduce the storage needed for each image. Some images are not compressed, while others are compressed with algorithms such as used in the JPEG standard, yielding smaller image files. Certain features of some more advanced digital cameras make it easy to fill up a memory card with large numbers of images. Two features, in particular, create a rapid succession of images in a short period of time. One of the features is bracketing, where a succession of several images is captured, each with a slight variation of certain camera settings. The other of the features is a repetition mode, in which the user can take a sequence of images, possibly by holding the shutter down. The former feature is useful when it is hard to set the camera for a certain exposure. The latter feature is useful for taking pictures of an object that is changing, such as a child that may not be smiling when the first picture is taken, but may subsequently smile when the second, third or fourth pictures are taken. There are other features that may also produce a series of similar images. In both instances, there is a high probability that certain aspects of each captured image will be similar or the same. For example, the backgrounds may all be similar while the subject may change in each frame.

Having these features may also create another problem, in that, taking so many images may quickly fill the user's memory card with sets of similar images. Still image compression, such as JPEG, may reduce the overall size of each individual image, but, at perhaps a megabyte per image, taking several sets of 4 to 5 images in rapid succession may quickly fill up even the highest capacity memory card. Another problem is the number of images that fit within the camera's higher-speed temporary memory. When taking the succession of images, current technology stores each image of the succession in a higher-speed temporary memory before moving to longer term storage, perhaps because there isn't sufficient time to store each image on a memory card. Since the higher-speed temporary memory is limited in size, only a small number of successive images may be stored within such memory. If a better compression method was available, a greater number of successive images could be captured.

Therefore, it would be desirable for a multi-image compression mechanism that will recognize a series of images and use motion encoding compression schemes to further compress the series of images.

SUMMARY OF THE INVENTION

Accordingly, the present invention is directed to a system and method for compressing still images using motion encoding.

In one aspect of the present invention, a series of images is analyzed as if the images were frames of a motion picture, using the first image as a base image and each subsequent image as an offset to that base image, so that each subsequent image is actually encoded as information about any changes, or delta information, from the base image, thereby reducing the overall storage required for the series of images.

In another aspect of the present invention, as a series of images are captured, the first image is used as a base image and each subsequent image is encoded as delta information with respect to the image before it. One single file may be created on the storage medium containing the base image and each subsequent delta image. Each image may be viewed by opening the base image and applying each set of delta information to the base image until arriving at the desired image. Furthermore, once the image set is copied onto a system with greater storage capacity, such as a personal computer, the set can be divided into atomic or complete images, perhaps storing each image of the series in a separate file, perhaps in a JPEG format, for each image.

In another aspect of the present invention, a camera captures a series of related images, then combines each image of the series into one file by using the first image as a base image and each subsequent image is recorded as delta information from the previous image in a manner similar to MPEG-2 encoding.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
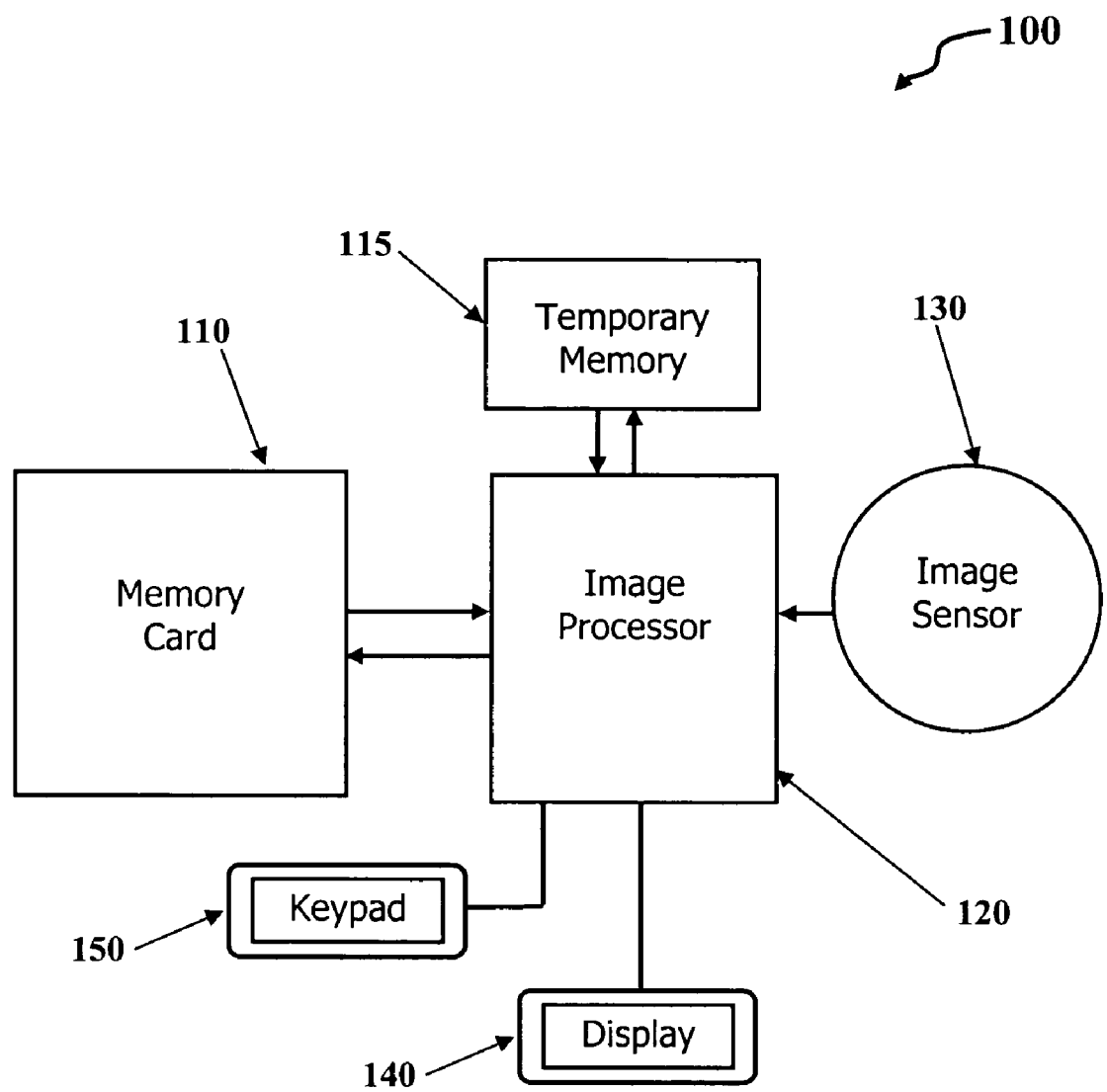
FIG. 1 is a schematic block diagram of an illustrative system implementing the present invention.

Referring generally now to FIG. 1, a schematic representation of an electronic system according to the present invention is shown. The system may be an electronic device 100, such as, for example, a digital photographic camera. The system includes a relatively longer term storage element for storing images, such as a memory card 110; a relatively shorter term storage element for storing program information as well as temporary images during the capture process, such as temporary memory 115; an image processor 120 for controlling the system and processing captured images; an image sensor 130 for capturing the image; a keypad 150 for accepting user input and commands; and a display 140 for displaying menus, images and perhaps a viewfinder image. It should be noted that this is an illustrative example of a system of the present invention, such as a camera, and that the present invention is not limited to this illustrative system, nor is the method of the present invention restricted to being performed only within a camera system. Furthermore, the present invention can also be practiced by a computer system, and may be performed by the computer system on a series of images that are already stored on the hard drive of the computer system.

In the present invention, inputs on the keypad 150 that are guided by menus on the display 140 may guide the user to set the camera to take multiple images, perhaps in rapid succession. Prior to the present invention, the image processor 120 would extract digital images at periodic intervals from the image sensor 130 and store them in the temporary memory 115. Once the succession was complete or the temporary memory was full, the image processor 120 would compress the captured images and store the compressed images on the memory card 110, perhaps in a predefined common format such as JPEG. Prior to the present invention, each image would be stored in a separate file, repeating all common information in each file as well as auxiliary information such as date, time and resolution.

The present invention contemplates storing multiple images in one file, with perhaps one set of auxiliary information. Furthermore, instead of storing a series of discrete and complete images in the file, a base image is stored, and for each additional image, delta information is stored, thereby reducing or eliminating redundant data in the file that is common to all images within the set. In one embodiment of the present invention, each image of the series is captured by the image processor 120 and stored in the temporary memory 115. Once the succession is complete, the images from the temporary memory 115 are analyzed for differences between the base image and each of the subsequently captured images. The information regarding the base image is stored, along with information regarding any changes (delta) between the base image and each of the subsequent images that have been captured, is stored in relatively longer term memory, such as the memory card 110.

In another embodiment, which may utilize a fast image processor 120, the first image is written to the temporary memory 115 as it is captured, then as subsequent images are captured, only the delta information is written to the temporary memory 115. This embodiment has an additional advantage of reducing the amount of temporary memory consumed by each image of the succession, thereby permitting a greater number of sequential images to be taken for a given amount of temporary memory 115.

Figure 2:
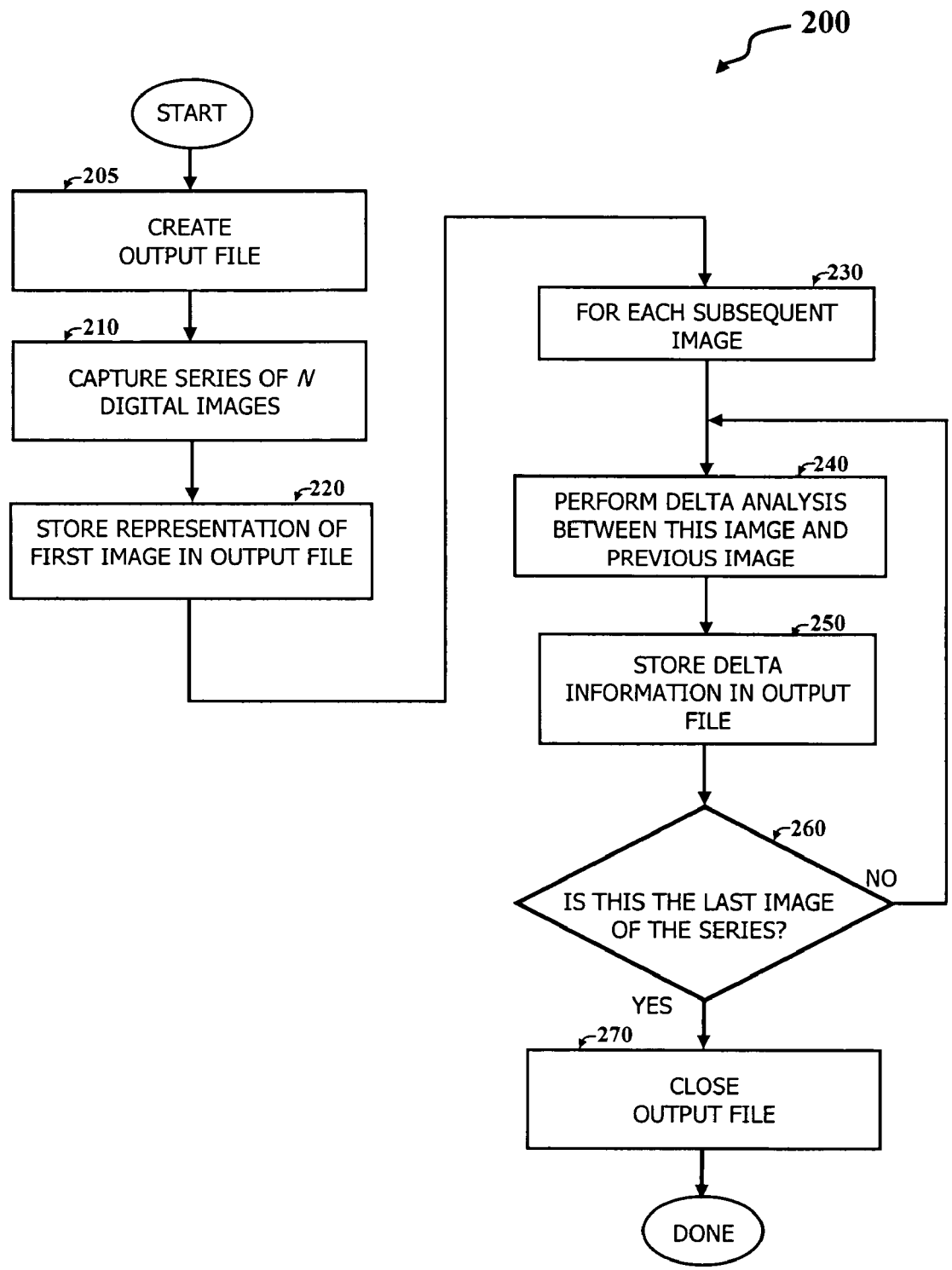
FIG. 2 is a flow chart of a first aspect of the present invention.

Referring now to FIG. 2, a flow chart of one aspect of the present invention is shown. Initially, an output file may be created for receiving the image information (205). Next, a series of n images are captured (210). The images may be stored in the temporary memory during processing. Once at least two images of the series of images are captured, the first image, possibly in compressed form, is written to the output file (230). The output file may be an image file according to the present invention that is stored on the memory card 110. Next, for each subsequent image in the series of images (235), the current image is compared to the previous image, or the base image, and differences between the present image and the previous image or base image are identified (240). The difference information is then written to or appended to the output file (250). If there are additional images in the series (260), the prior two steps (240 and 250) are repeated for each subsequent image until the last image is processed. The output file may then be closed (270).

Figure 3:
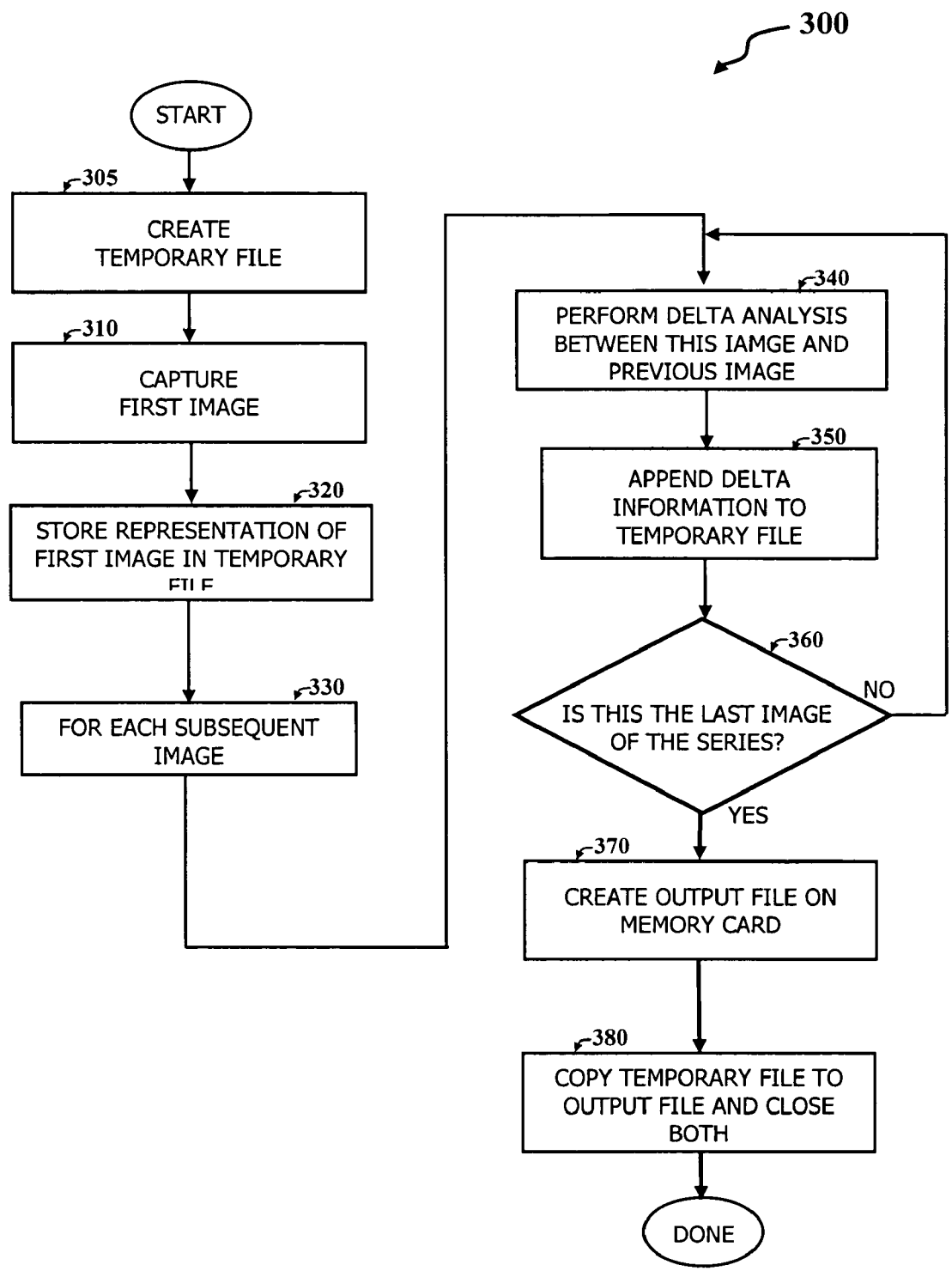
FIG. 3 is a flow chart of a second aspect of the present invention.

Referring now to FIG. 3, a flow chart of a second aspect of the present invention is shown. Initially, a temporary file may be created (305). Next, a first image is captured (310). The first image is stored in the temporary file 320. The first image may be stored in compressed form, possibly in a JPEG format. The temporary file is stored in the image memory 115 to gain speed, since image memory 115 may be much faster than memory card 110. Next, for each subsequent image (335), the current image is compared to the previous image, and differences between the present image and the previous image or base image are identified (340). The difference information is then written or appended to the temporary file (350). If there are additional images in the series (360), the prior two steps (340 and 350) are repeated for each subsequent image until the last image is processed. Once the series is complete, the output file is created 370 and the information in the temporary file is copied to the output file 380. The movement of the information from the temporary file to the output file may optionally include further compressing of the image information, and thus the information on the output file may or may not be a direct bit-for-bit copy of the information in the temporary file.

Figure 4:
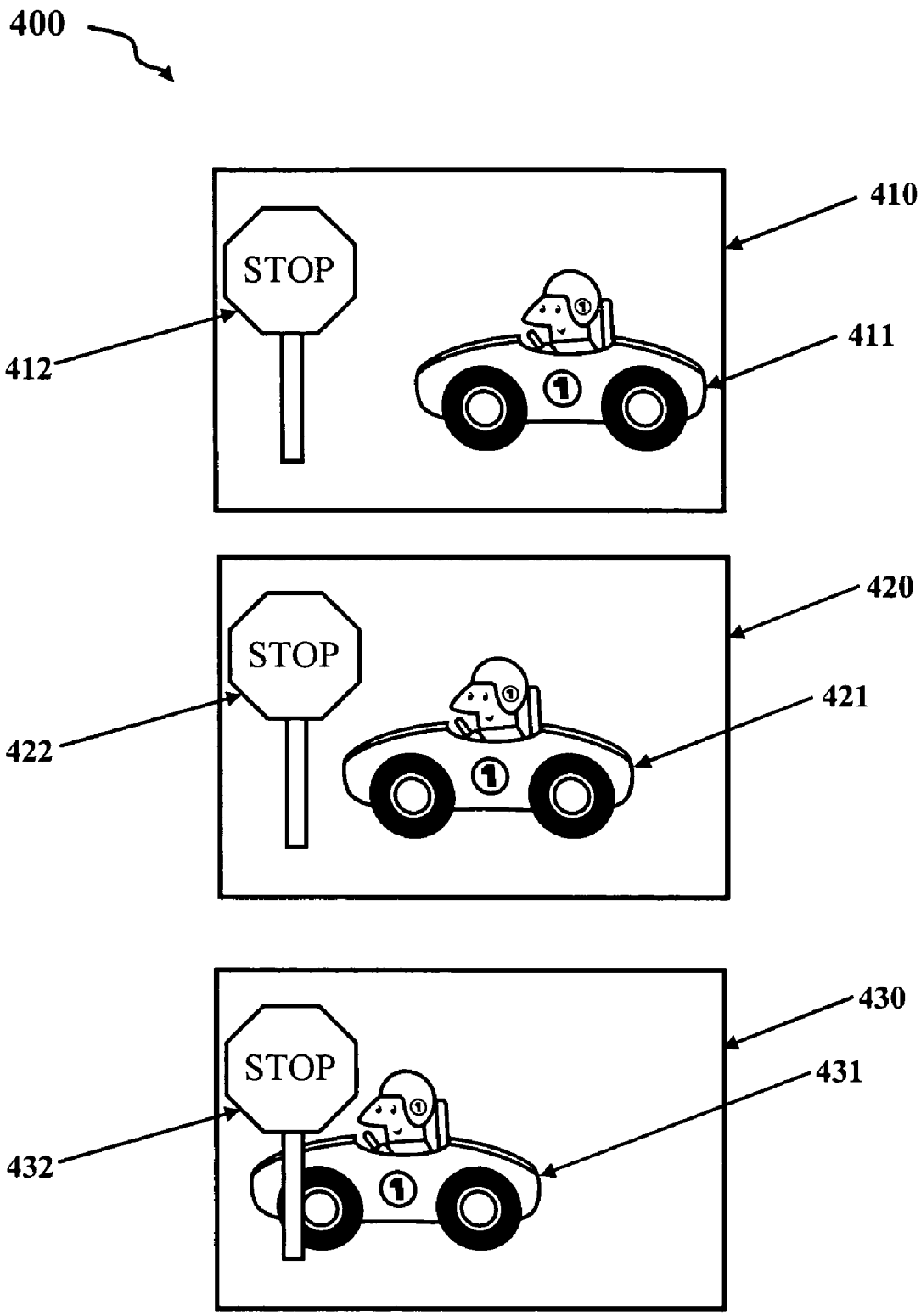
FIG. 4 is a representation of a set of images that may be compressed using the present invention.

Referring now to FIG. 4, a set of three sample images is depicted that may be processed according to the present invention. In this example, the image 310 consists of a car 311 and a stop sign 312. The images 320 and 330 also include a car (321 and 331) and a stop sign (322 and 332). The only difference between the three images (310, 320, and 330) is the location of the car (311, 321, and 331), in that the car is located in different positions in each image (310, 320, and 330). In the method of the present invention, the first image 310 captured would be recorded and stored, either on memory card 110 or in a temporary file in memory 115. The first, or base, image may be stored in compressed format. The second image 320 is captured, and it is compared to the first image, instead of storing the entire image as a separate image file. When the comparison is made, it is determined that the background as well as the stop sign are the same, and in the same position, and that only the car 321 is different (e.g., in position). Therefore, information regarding the movement of object 311 to the position of object 321 may be recorded in the output file or temporary file, or information regarding the changed sections, sub-picture or pixels may be written. When the third image 330 is captured, it would be compared to the first image, or in a preferred embodiment, to the second image, and instead of storing the entire image as a separate image file, it is compared to the stored image and it is determined that the entire background as well as the stop sign are the same and in the same position, and that only the car 331 is different. Therefore, information regarding the movement of object 321 to the position of object 331 may be recorded in the output file or temporary file, or information regarding the changed sections, sub-picture or pixels may be written. Optionally, the movement of object 311 to the position of object 331 could be recorded. Once all images in the sequence (310, 320, and 330) are captured and compressed, if the images have been written to the output file, the output file is finalized and closed. If the images are being written to a temporary file, the temporary file is either copied to the memory card 110 or an output file is created on the memory card 110 and the contents of the temporary file is transferred to the output file. Optionally, changes may be made to the information as it is transferred, possibly for achieving further compression of the file.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method of compressing a series of still digital images comprising:
    capturing a first digital image of a series of digital images;
    storing said first digital image in an output file;
    capturing at least one more digital image of said series of digital images; and
    for each digital image of said at least one more digital image:
        comparing said each digital image to said first digital image to create a set of difference data;
        appending said set of difference data to said output file.

2. The method of compressing a series of still digital images of claim 1 wherein said output file is located in a temporary memory.

3. The method of compressing a series of still digital images of claim 2 further comprising:
    closing said output file and copying said output file from said temporary memory to a memory card.

4. The method of compressing a series of still digital images of claim 1 wherein said output file is located in a memory card.

5. The method of compressing a series of still digital images of claim 1 wherein said comparing is performed by comparing sub-picture elements.

6. The method of compressing a series of still digital images of claim 1 further comprising:
    closing said output file.

7. The method of compressing a series of still digital images of claim 1 wherein said at least one more digital image of said series of digital images is different than said first digital image of said series of digital images.

8. The method of compressing a series of still digital images of claim 1 wherein said at least one more digital image of said series of digital images is captured at a time after said first digital image of said series of digital images.

9. A method of compressing a series of still digital images comprising:
    capturing a first digital image of a series of digital images;
    storing said first digital image in an output file;
    capturing at least one more digital image of said series of digital images; and
    for each digital image of said at least one more digital image:
        comparing said each digital image to a previous digital image to create a set of difference data;
        appending said set of difference data to said output file.

10. The method of compressing a series of still digital images of claim 9 wherein said output file is located in a temporary memory.

11. The method of compressing a series of still digital images of claim 10 further comprising:
    closing said output file and copying said output file from said temporary memory to a memory card.

12. The method of compressing a series of still digital images of claim 9 wherein said output file is located in a memory card.

13. The method of compressing a series of still digital images of claim 9 wherein said comparing is performed by comparing sub-picture elements.

14. The method of compressing a series of still digital images of claim 9 further comprising:
    closing said output file.

15. A camera comprising:
    an image sensor;
    an image processor connected to said image sensor;
    a memory connected to said image processor;
    logic in communication with said image processor configured to capture a series of still digital images from said image sensor; and
    logic configured to compress said series of still digital images by recording a base image and difference information for each subsequent digital image in said series of still digital images.

16. The camera of claim 15 wherein said logic configured to compress creates an output file located in a temporary memory.

17. The camera of claim 15 wherein said logic configured to compress creates an output file on a memory card.

18. The camera of claim 15 wherein said logic configured to compress comprises measuring differences between said each subsequent image and storing said differences in said memory.

19. The camera of claim 15 wherein said logic configured to capture a series of still digital images comprises holding a shutter mechanism to signal said image processor to continue capturing images until said shutter mechanism is disengaged.

20. The camera of claim 15 wherein said logic configured to capture a series of still digital images comprises setting a control parameter using a keypad so that said image processor captures a sequence of at least two digital images when a shutter mechanism is engaged.

* * * * *